E. M. MILLER.
VARIABLE SPEED GEARING.
APPLICATION FILED FEB. 12, 1918.
1,405,713.
Patented Feb. 7, 1922.
2 SHEETS—SHEET 1.
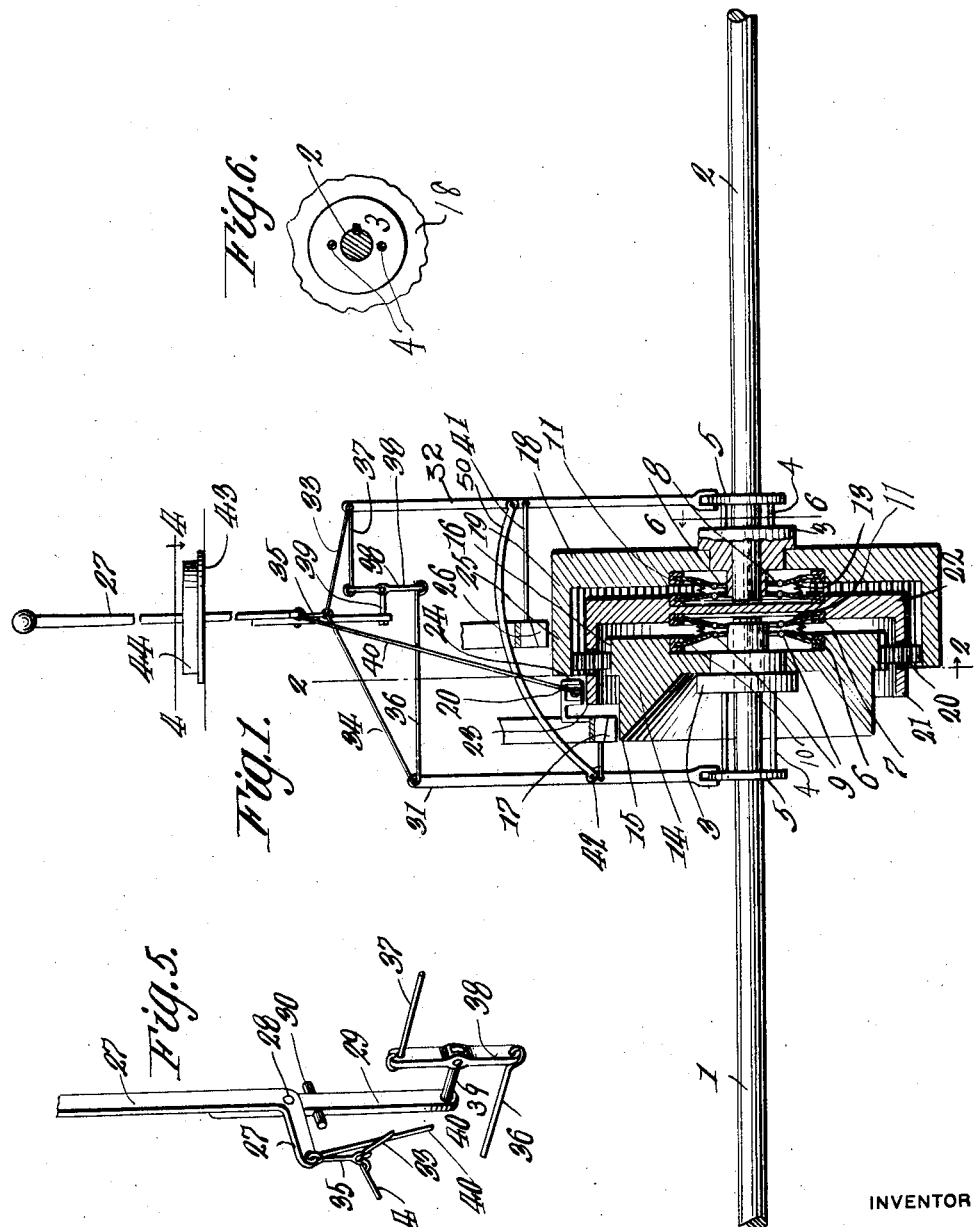
INVENTOR
*Emmett M. Miller.*
WITNESSES
*Guy M. Spring*
*S. M. McColl*
BY *Richard B. Owen.*
ATTORNEY

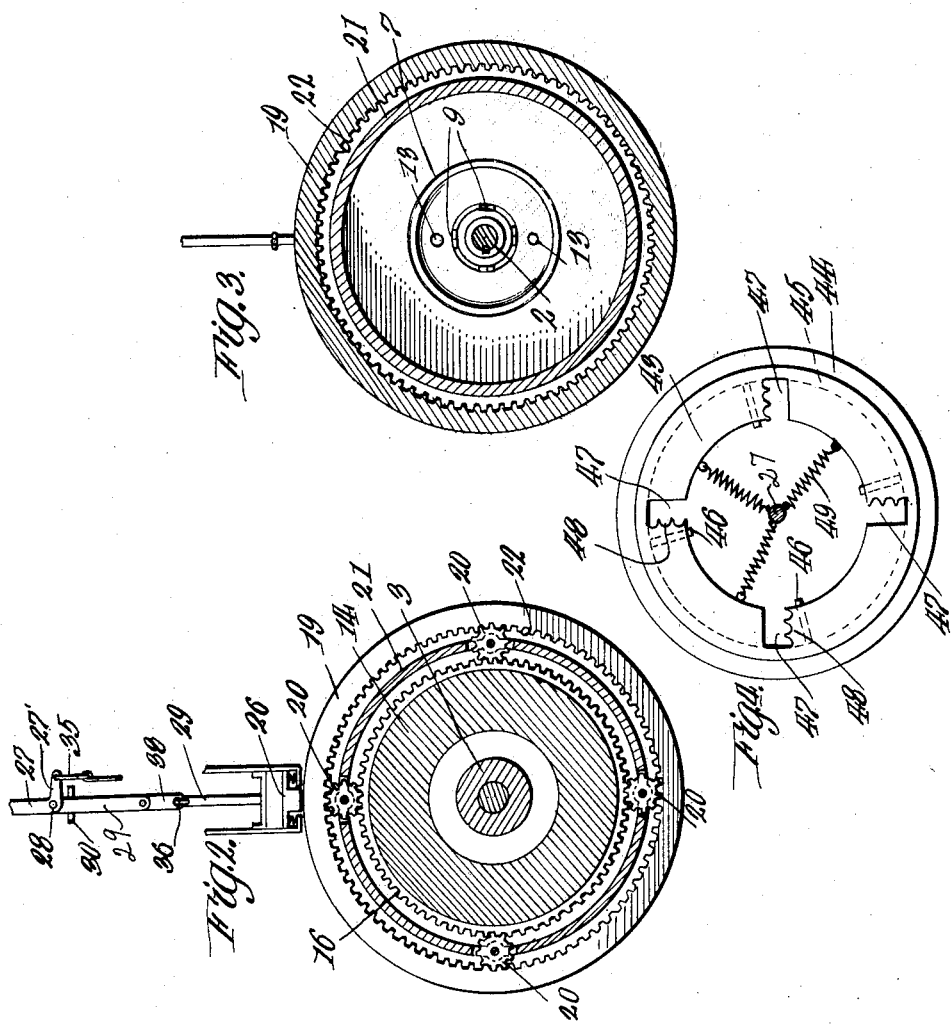

UNITED STATES PATENT OFFICE.

EMMETT M. MILLER, OF BASSETT, NEBRASKA.

VARIABLE-SPEED GEARING.

1,405,713.  Specification of Letters Patent.  Patented Feb. 7, 1922.

Application filed February 12, 1918. Serial No. 216,768.

*To all whom it may concern:*

Be it known that I, EMMETT M. MILLER, a citizen of the United States, residing at Bassett, in the county of Rock and State of Nebraska, have invented certain new and useful Improvements in Variable - Speed Gearings, of which the following is a specification.

This invention relates to variable speed gearing particularly applicable for use with motor vehicles and the like.

The object of the invention is to provide a simple and efficient three-speed gear of this character, which while very efficient in operation is simply and cheaply constructed and may be readily applied to any motor vehicle.

Another object is to provide a peculiarly constructed clutch for use in connection with this gearing or transmission.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation partly in section of the gearing constituting this invention, Fig. 2 is a transverse vertical section taken on the line 2—2 of Fig. 1, Fig. 3 is a similar view taken on the line 3—3 of Fig. 1, Fig. 4 is a horizontal section taken on the line 4—4 of Fig. 1, Fig. 5 is a detail perspective view of the operating lever and the parts adjacent thereto, and Fig. 6 is a transverse section taken on the line 6—6 of Fig. 1.

Fig. 7 is a diagrammatic view showing the parts of the device constituting this invention in the various positions assumed.

In the embodiment illustrated a drive shaft 1 is shown between which and the alined driven shaft 2 is arranged the transmission constituting this invention. This transmission embodies collars 3 which are fixed to the shafts 1 and 2 near their adjacent ends and through which extend a plurality of pins 4. These pins 4 are engaged with collars 5 which slide on said shafts 1 and 2.

Clutch members 6 and 7 are carried by collars 8 being hinged thereto as shown at 9. These clutches 6 and 7 are each composed of two annular plates 10 and 11 which converge toward their inner ends and are hingedly connected to the collars 8 carried by the shafts 1 and 2. The peripheral edges of these plates are spaced apart by coiled springs 13 which operate to hold said clutch plates in normal position.

A spur gear 14 is carried by the drive shaft 1 and has a braking surface 15 arranged outside its toothed portion 16 and which is adapted to be engaged by a brake 17 hereinafter more fully to be described.

An internal gear 18 is carried by shaft 2, the peripheral flange 19 of which extends toward and overlaps gear 14, being spaced radially therefrom a sufficient distance to accommodate a plurality of pinions 20 which are journaled in the flange 21 of a toothless intermediate gear or planet carrier 22 which is arranged between the ends of shafts 1 and 2 as is shown clearly in Fig. 1. The flange 21 of the carrier 22 projects beyond the edge of the toothed flange 19 of gear 18 and is provided with a braking surface 23 with which a brake 24 is designed to co-operate. The pinions 20 carried by the carrier 22 mesh with the spur gear 14 and with the internal gear 18 to effect a driving connection between them as will be presently described. The gear 18 is also provided with a peripheral braking surface 25 with which a brake 26 is designed to co-operate for a purpose to be described.

An operating hand lever 27 is mounted in a suitable position convenient for actuation by the driver and is here shown in the form of a bell crank fulcrumed at 28 on an upright support 29 which is designed to be journaled to swing laterally by means of a pin 30 which enters suitable journals in a support, not shown.

Two clutch levers 31 and 32 are engaged at one end with the collars 5 on shafts 1 and 2 as shown in Fig. 1 and at their other ends are connected by links 33 and 34 with an upright link 35 which depends from the short arm 27' of the bell crank lever 27 as is shown clearly in Figures 1 and 5. The upper ends of the levers 31 and 32 are further connected with each other through rods 36 and 37 engaged at one end with the upper ends of said levers and connected at their other ends with the ends of a lever 38 fulcrumed intermediately of its ends on a pin 39 which extends laterally from the lower end of the support 29.

A brake rod 40 connects the free end of the arm 27' of the bell crank with the brake 24 above referred to, while a similar rod 41 connects the lever 32 at a point midway its ends with the brake 26 which co-operates with the gear 18, said rod 41 being here shown extending laterally at right angles to the lever 32. Another rod 42 connects lever 31 midway its ends with the brake 17 which co-operates with the spur gear 14. An arcuate rod 50 is pivotally connected at its ends with levers 31 and 32 adjacent their connection with the brake rods 41 and 42, and is used both for pulling and pushing when lever 27 is operated.

The lever 27 is encircled by an annular plate 43 mounted on a suitable support, not shown, which is usually the floor of the car and which has an upstanding flange 44.

Mounted to rotate within the flange 44 of the plate 43 is a loosely disposed ring 45 provided with a plurality of inwardly projecting radial fingers 46 which are designed for a purpose presently to be described. The plate 43 has a plurality of radially extending slots 47, four of which are here shown and arranged in pairs at diametrically opposite points. One side wall of each of these slots is notched as shown at 48, said notches being designed to receive the lever 27 when it is moved into the slot and thereby hold said lever in adjusted position, its release being accomplished by the rotation of plate 45 which causes one of its fingers 46 to engage said lever and force it out of engagement with the notch of the slot in which it is disposed. A plurality of coiled springs 49, three of which are here shown connect the plate 43 with lever 27 and which operate to return said lever to neutral position when disengaged in the manner just described. If desired, the plate 45 could be connected with an emergency brake, not shown, so that when said brake is set it would shift plate 45 to cause one of its pins to release lever 27 and when so released the springs 49 will return the lever into neutral position, which would disengage the engine from the driving mechanism of the car.

In the operation of this mechansm, when the hand lever 27 is moved forward or toward the left (see Fig. 1), the upper ends of levers 31 and 32 will be moved toward the right or rearward owing to their connection by rods 36 and 37 and rod 50, and their lower ends toward the left or forward, both clutches 6 and 7 will be moved forward which will connect gear 14 with the engine shaft, and also connect the planet carrier 22 to the drive shaft 1. This movement also operates to apply brake 26 to the periphery of gear 18 and when the parts are so connected the machine will be in condition for low speed, power being transmitted through shaft 1, gear 14, and carrier 22 to the driven shaft 2.

Owing to the peculiar connection of the lever 27 with the levers 31 and 32 the sidewise movement of lever 27 will operate to produce a vertically reciprocatory motion on the links connecting the levers 31 and 32. It will thus be seen that when said links are moved downwardly the levers 31 and 32 will be spread apart at their upper ends thereby causing the clutches to move toward each other and both of which to engage with the carrier 22 making a direct drive between shafts 1 and 2.

To place the parts in position for high or fast speed the hand lever 27 is moved rearwardly or toward the right thereby causing the upper ends of levers 31 and 32 to move forward and their lower ends rearward which operates to throw the clutches rearwardly and to position them in engagement with the gears 22 and 18, simultaneously applying the brake 17 to the surface 15 of the spur gear 14 thereby holding said spur gear against rotation. This operation also operates simultaneously to release the brake 26 from its engagement with gear 18 and when the parts are in this position the lever 27 will enter one of the slots 47 and be locked in one of the notches 48 thereof if found desirable, and it may be released as above described by the turning of the plate 45, which through its fingers 46 operate to disengage the lever from said notches and under the action of the springs 49 will be returned to neutral position.

To throw the parts in position for reverse, the hand lever 27 is moved to one side thereby raising the links connected therewith and exerting a pull on the upper ends of the levers 31 and 32 bringing them toward each other and causing the clutches carried at their lower ends to be spread apart and engaged with wheels 14 and 18 simultaneously applying the brake 20 to the braking face 23 of gear 22, it being necessary that this gear be held rigid during the reversing operation.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. In a transmission gearing, a driving shaft, a driven shaft, a plurality of gears for imparting motion from the driving to the driven shaft embodying a plurality of clutching devices each having a movable element for effecting a clutching action upon the gears, an actuating member having means for successively operating said elements, and a braking mechanism embodying a movable element for effecting a braking action upon the gears, said actuating member also having means for operating said last mentioned element to effect a braking action at points in the path of movement of the actuating member intermediate the points of operation of the first mentioned means.

2. The combination with longitudinally alined driving and driven shafts, collars fixed to the opposed ends of said shafts, other collars slidable on said shafts and having pins mounted to slide through said first mentioned collars, clutch members positioned in the path of said pins for actuation thereby, gears mountd to be connected with said shafts through said clutch members, and clutch operating means under the control of the operator.

3. In a transmission gearing, a driving shaft, a driven shaft, mechanism for imparting motion from the driving to the driven shaft embodying spur and internal gears, a planet gear therebetween, clutching devices arranged between the gears for normally retaining the gears clutched and means whereby the clutch devices may be operated to cause the planet gear to remain idle.

4. In a transmission gearing, a driving shaft, a driven shaft, mechanism for imparting motion from the driving to the driven shaft embodying a spur gear carried by the driving shaft, an internal gear carried by the driven shaft, a toothless gear disposed between said shafts, means whereby said toothless gear may be connected with either or both of the toothed gears, and braking mechanism for said gears.

5. In a transmission gearing, a driving shaft, a driven shaft, mechanism for imparting motion from the driving to the driven shaft, embodying a spur gear carried by the driving shaft, an internal gear carried by the driven shaft, a toothless gear disposed between said shafts, means whereby said toothless gear may be connected with either or both of the toothed gears, brakes for each gear, and means for simultaneously actuating aforesaid means and applying certain of the brakes.

6. The combination with longitudinally alined driving and driven shafts, an external gear carried by said driving shaft and having an annular braking surface, a gear member carried by said driven shaft, and having an annular peripheral flange toothed on its inner face and its outer face forming a brake surface, a similar shaped toothless gear arranged between the opposed ends of said shafts, pinions carried by the flange of said toothless gear and meshing with the other gears, clutch members for connecting said gears to the respective shafts, levers for actuating said clutch members, and brakes for said gears controlled by said levers.

7. In a transmission gearing, a driving shaft, a driven shaft, a mechanism for imparting motion from the driving to the driven shaft embodying a plurality of gears normally clutched together, means whereby one gear may be connected with either or both of other said gears and including a pair of levers, means pivotally connecting the levers, and an operating means for causing corresponding ends of the levers to move in the same direction or in opposite directions.

8. In a transmission gearing, a driving shaft, a driven shaft, a mechanism for imparting motion from the driving to the driven shaft embodying a plurality of gears normally clutched together, means whereby one of the gears may be connected with either or both of the other gears embodying a pair of levers, means for pivotally connecting the levers, braking means carried by said levers, an operating lever, links connecting corresponding ends of said levers to said operating lever, an operating bar pivotally connected to the operating lever, said bar being pivotally mounted so that the operating lever may move laterally, and links connecting said operating bar to said corresponding ends of the said pair of levers.

9. In a transmission gearing, a driving shaft, a driven shaft, collars carried by the shafts and slidably mounted thereon, a gear rotatably mounted upon each collar, a planet gear disposed between said shafts, clutching devices carried by said collars and normally engaging said gears, and means operable through said collars for engagement with said clutching devices for effecting this engagement of the clutches with either or both of said gears mounted upon said collars.

In testimony whereof I affix my signature in presence of two witnesses.

EMMETT M. MILLER.

Witnesses:
W. A. BUCHLIN,
HOWARD O. WILSON.